(12) United States Patent
Li et al.

(10) Patent No.: US 12,316,023 B2
(45) Date of Patent: May 27, 2025

(54) MULTI-PORT MULTI-ELEMENT MILLIMETER WAVE MOBILE PHONE ANTENNA STRUCTURE

(71) Applicant: Hsueh-Jyh Li, New Taipei (TW)

(72) Inventors: Hsueh-Jyh Li, New Taipei (TW); Chi-Min Lee, Keelung (TW); Pao-Jen Wang, New Taipei (TW); Pei-Shan Lu, New Taipei (TW)

(73) Assignee: Li Hsueh-Jyh, New Taipei (TW)

( * ) Notice: Subject to any disclaimer, the term of this patent is extended or adjusted under 35 U.S.C. 154(b) by 348 days.

(21) Appl. No.: 18/146,217

(22) Filed: Dec. 23, 2022

(65) Prior Publication Data

US 2023/0208030 A1 Jun. 29, 2023

(30) Foreign Application Priority Data

Dec. 28, 2021 (TW) .................................. 110149529

(51) Int. Cl.
*H04Q 3/42* (2006.01)
*H01Q 1/24* (2006.01)
*H01Q 3/42* (2006.01)
*H04B 1/30* (2006.01)

(52) U.S. Cl.
CPC .............. *H01Q 3/42* (2013.01); *H01Q 1/241* (2013.01); *H04B 1/30* (2013.01); *H04B 2001/307* (2013.01)

(58) Field of Classification Search
CPC .................................. H04B 1/30; H04Q 1/241
USPC .................................. 370/329, 400, 402, 403
See application file for complete search history.

(56) References Cited

FOREIGN PATENT DOCUMENTS

WO WO-2020124424 A1 * 6/2020

* cited by examiner

*Primary Examiner* — Dang T Ton
(74) *Attorney, Agent, or Firm* — Sinorica International Patent & Trademark

(57) ABSTRACT

A millimeter wave mobile phone antenna structure including: a plurality of antenna elements, each antenna element having a port; a plurality of signal acquisition units, each having a mixer and an analog-to-digital converter to produce a digital sampled signal of a sub-carrier signal output by each port; and a baseband signal processor, used for multiplying the digital sampled signal of each sub-carrier signal with a real time channel frequency response related weighting function and sum up the products to obtain a total output value of the antenna structure. The difference between the antenna structure of the present invention and the current millimeter-wave antenna structure of mobile phones is that: the present invention uses antenna elements instead of antenna arrays; and the antenna structure of the present invention provides multi-port output signals, rather than a single output digital, to facilitate the adaptability of received signals combining on the baseband end.

6 Claims, 24 Drawing Sheets

MULTI-PORT MULTI-ELEMENT MILLIMETER WAVE MOBILE PHONE ANTENNA STRUCTURE

BACKGROUND OF THE INVENTION

Field of the Invention

The present invention relates to wireless communication, in particular to a millimeter-wave antenna structure for mobile phones.

Description of the Related Art

The fifth generation mobile communication system (5G) includes two frequency bands, FRI (sub 6G) and FRII (Millimeter Wave), that is, 5G mobile phones use the above two frequency bands for communication. The millimeter-wave mobile phone antenna element usually uses a microstrip antenna (patch antenna), and currently the mobile phone millimeter-wave antenna uses multiple antenna arrays, each array has four antenna elements, and each antenna element is connected to a phase shifter. By adjusting the phase of the phase shifter of each antenna element, the radiation pattern of the array will be concentrated in a certain direction, and each array can be individually beamformed to a better state, and a group of the best arrays in the arrays can be chosen to transmit uplink and downlink data.

As each antenna element is connected to a phase shifter, there will be an insertion loss of 2-3 dB produced by the phase shifter. In addition, it requires a selection switch to select an array from the multiple arrays, and this switch will generate another 1-2 dB insertion loss.

In addition to reducing the level of the signal, the insertion loss will also generate additional heat and consume energy from the battery of the mobile phone. In addition, since each antenna array is composed of four antenna elements, the space occupied by each antenna array is four times that of an antenna element. Therefore, placing multiple antenna arrays on a mobile phone is not as flexible as placing multiple antenna elements. In addition, as far as the technology of antenna on chip is concerned, it is much easier to integrate antenna elements on a chip than to integrate antenna arrays.

In the existing antenna array scheme, the signal processing method thereof includes multiplying the received signal of each antenna element with a phase to derive a product, combining the products at the radio frequency (RF) end, and the phase for different antenna elements are the same. In addition, a selection switch is also set at the RF end to select an optimal array among multiple arrays. In addition, the single-port corresponding hardware components (phase shifters and switches) at the RF end cannot be effectively compensated over specific frequency components, so its output may have serious attenuation at certain frequency components, thereby reducing the transmission performance over the whole signal frequency band.

In order to solve the above problems, there is an urgent need in the art for a novel millimeter wave mobile phone antenna structure.

In addition, the 5G millimeter wave scheme of the invention has multi-input multi-output (MIMO) architecture to transmit multiple sets of independent data at the same time, while the existing single port multi-array antenna architecture can only transmit one set of data at a time. In contrast, the invention has a multi-port architecture, which can simultaneously transmit up to four sets of different data in conjunction with the multi-port antenna architecture of the base station, thereby greatly increasing the transmission capacity of the wireless communication system.

SUMMARY OF THE INVENTION

The main objective of the invention is to disclose a multi-port multi-element millimeter wave mobile phone antenna structure, which can provide a port by a single patch (microstrip antenna) to greatly reduce the occupied area for the antenna structure on the printed circuit board. In addition, since a single microstrip antenna occupies a small area, it can be placed in a very flexible position. It can be placed on the narrow side of the mobile phone or on a circuit board at the back of the mobile phone. In contrast, an antenna array (including four microstrip antennas) has limited places to be placed in the mobile phone.

In addition, the current millimeter-wave antenna structure for mobile phones has multiple antenna arrays, each antenna array is composed of four antenna elements, and each antenna element is connected to a phase shifter to change the phase. The phase shifter will cause 2-3 dB insertion loss. In addition, since the current millimeter-wave antenna structure for mobile phones selects the best antenna array among the antenna arrays for transmission and reception, a selection switch is required, and the selection switch will cause 1-2 dB insertion loss, resulting in signal loss, signal level drop, extra heat and energy consumption from the battery of the mobile phone. In contrast, the antenna structure of the invention has neither a phase shifter nor a selector switch, so there are no above-mentioned problems of the current millimeter-wave antenna structure for mobile phones.

In addition, the present invention is especially suitable for indoor environments with multi-path waves and situations where direct waves are blocked by a human body. When the direct wave is blocked by the human body and the incoming wave entering the mobile phone lacks a main wave, it is difficult for the antenna array to perform the beamforming function, and the interference of multi-path waves will cause the signal to fade at different frequencies. The invention uses a multi-port architecture, and each frequency component of each port signal is fed to the baseband signal processor after being sampled, and the port signals are effectively combined for each frequency, so that the aforementioned attenuation phenomenon can be effectively eliminated.

In addition, the microstrip antenna element structure used in the present invention is easy to integrate on the chip with the newly developed antenna on chip technology.

In addition, although each port of the invention requires a transceiver module, as the technology of the transceiver module is very mature, and multiple modules can be integrated in a chip, the increased space and cost are limited.

In order to achieve the aforementioned objective, a millimeter wave mobile phone antenna structure is proposed, which includes:

a plurality of antenna elements, each of which provides a port;

a plurality of mixers, each used to perform a mixing process on an output signal of one of the ports;

a plurality of analog-to-digital converters used to perform analog-to-digital conversions on the output signals of the mixers to generate a plurality of base-frequency digital signals; and a baseband signal processor having a plurality of weighting function modules and a summation function module, where the weighting function modules are used to multiply the baseband digital signals by a corresponding weighting function, and the summing function module is used to sum up the output values of the weighting function modules.

In one embodiment, the mixing process includes an OFDM signal processing.

In one embodiment, the antenna element is a microstrip antenna.

In one embodiment, the weighting function corresponding to the m-th port is expressed as follows:

$$W_m(\omega_q) = \frac{H_m^*(\omega_q)}{\left(\sum_m |H_m(\omega_q)|^2\right)^{1/2}},$$

where $w_m(\omega_q)$ represents the weighting function, $\omega_q$ represents the qth subcarrier, $H_m(\omega_q)$ represents the channel response of the mth antenna element when the subcarrier frequency is $\omega_q$.

In one embodiment, the output formula of the summing function module is as follows:

$$y_0(\omega_q) = \sum_{m=1}^{4} w_m(\omega_q) \cdot y_m(\omega_q) = \left(\sum_m |H_m(\omega_q)|^2\right)^{1/2},$$
$$|y_0(\omega_q)|^2 = \sum_m |H_m(\omega_q)|^2;$$

that is, the final output power of each frequency is the sum of the power of each port at that frequency.

In one embodiment, in the application of 5G millimeter wave communication, the phase antenna array of the base station sequentially changes the beam number to change the direction of the field beam of the antenna array, and repeatedly transmits the broadcast signal to the mobile phone equipped with the millimeter wave antenna structure of the invention, the mobile phone receives RSSI (radio signal strength indicator) of broadcast signals transmitted by different beam numbers, and reports which beam number is most suitable for the mobile phone to the base station. Afterwards, the base station performs data communication with the mobile phone by using the beam number.

In a possible embodiment, the millimeter-wave antenna structure for a mobile phone of the invention can be applied to an FDD (Frequency division duplex) system or a TDD (Time division duplex) system.

In one embodiment, in the uplink data transmission process of the frequency division duplex system, a best antenna element will be selected from these antenna elements to transmit uplink data, and the decision of the best antenna element is as follows:

$m_0 = \max\{R(i_0, m)\}$, where $R(i_0, m)$ is the RSSI of the broadcast signal received by the m-th antenna element among the 4 antenna elements when a base station transmits the broadcast signal with a beam number $i_0$.

To make it easier for our examiner to understand the objective of the invention, its structure, innovative features, and performance, we use preferred embodiments together with the accompanying drawings for the detailed description of the invention.

DETAILED DESCRIPTION OF THE PREFERRED EMBODIMENTS

Figure 1:
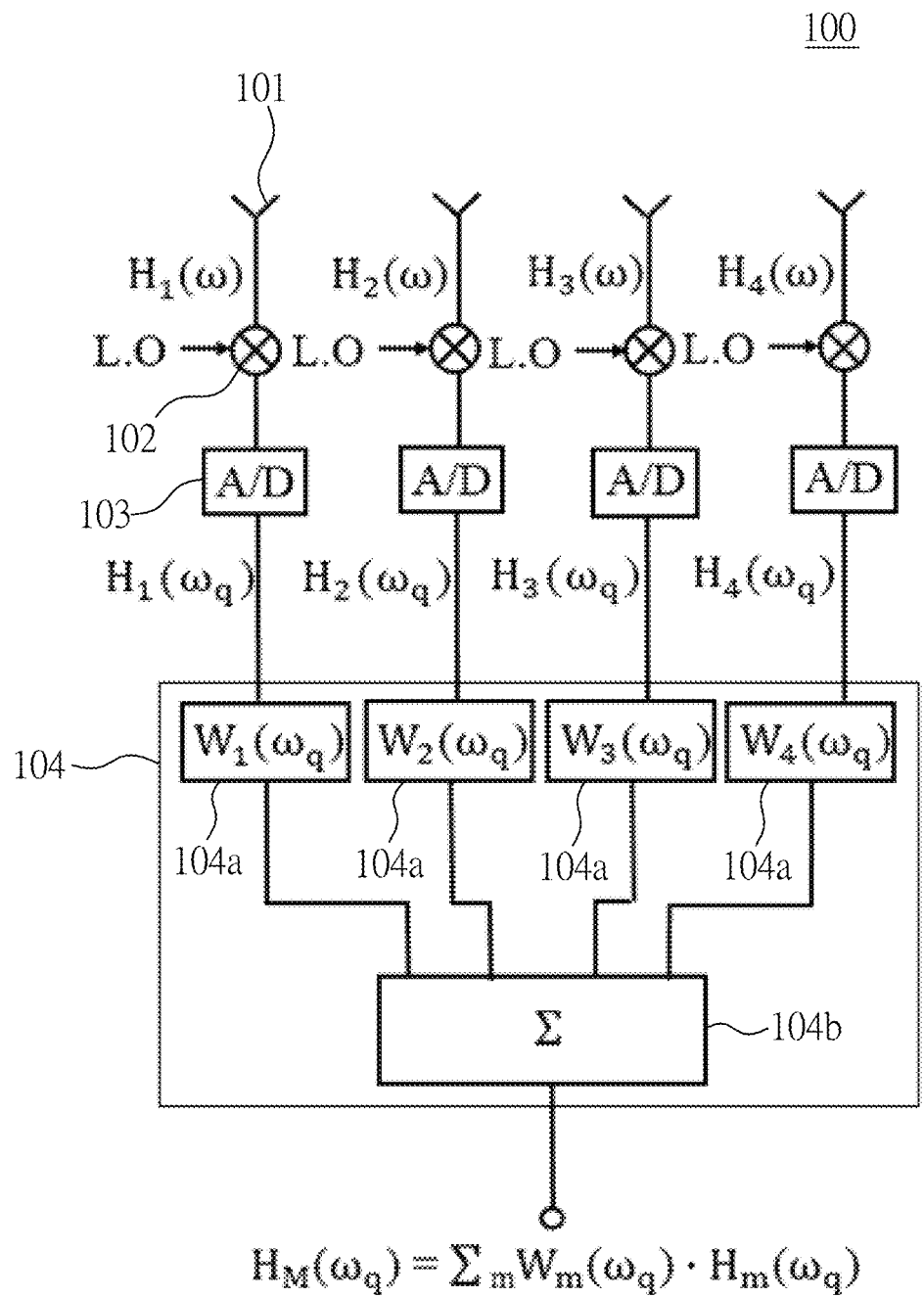
FIG. 1 shows a block diagram of an embodiment of a millimeter-wave antenna structure for a mobile phone with multiple ports and multiple antenna elements according to the present invention.

Please refer to FIG. 1, which shows a block diagram of an embodiment of a millimeter-wave antenna structure for a mobile phone with multiple ports and multiple antenna elements according to the present invention. As shown in FIG. 1, a millimeter-wave a mobile phone antenna structure 100 has multiple antenna elements 101, multiple mixers 102, multiple analog-to-digital converters 103, and a baseband signal processor 104, where the baseband signal processor 104 has multiple weighting function modules 104a and a summing function module 104b.

In the architecture of the invention, each antenna element 101 is used as a port, the output signal $H_m(\omega)$ of each port, m representing the position of the port, passes through a mixer 102 and an analog-to-digital converter 103 to generate a baseband digital signal $H_m(\omega_q)$, each baseband digital signal $H_m(\omega_q)$ is multiplied by a weighting function $W_m(\omega_q)$ by a corresponding weighting function module 104a in the baseband signal processor 104, and the summing function module 104b performs a summing calculation to generate a system output signal $H_M(\omega_q)$, $H_M(\omega_q) = \Sigma_m W_m(\omega_q) \cdot H_m(\omega_q)$.

In addition, in the above-mentioned architecture, the output signal $H_m(\omega)$ of each port passes through a T/R (transmit/receive) switch and a low-noise amplifier (not shown in the figure), and the mixer 102 and the analog-to-digital converter 103 are combined to provide an OFDM signal processing to generate a fundamental frequency digital signal $H_m(\omega_q)$, that is, the mixer 102 uses two local oscillating signals having a phase difference of 90 degrees to mix $H_m(\omega)$ to generate two quadrature signals, and the analog-to-digital converter 103 performs analog-to-digital conversion operations on the two quadrature signals to generate a base frequency digital signal $H_m(\omega_q)$. $H_m(\omega_q)$ represents the channel response of the mth antenna element at the subcarrier frequency $\omega_q$, where the channel response can be measured or estimated from a pilot signal channel response or a reference signal channel response, that is, real-time frequency response can be derived.

In addition, it is worth noting that each weighting function $W_m(\omega_q)$ is a function of the subcarrier, that is, the combination of each port signal is adaptively determined according to the situation of each subcarrier, and each subcarrier has its own weighting function, unlike the antenna array beamforming method, the phase multiplied by each element and the phase multiplied by each subcarrier are the same.

In addition, the invention proposes a rule for selecting a base station beam number for a multi-port multi-antenna element architecture, and a signal processing rule for uplink and downlink data transmission.

When performing a 5G millimeter wave communication, the phase array antenna of a base station changes the beam number in sequence to change the direction of the field beam of the antenna array, and repeatedly transmits the broadcast signal to a mobile phone; the mobile phone receives the RSSI (radio signal strength indicator) of the broadcast signal transmitted by different beam numbers, and reports to the base station which beam number is most suitable for the mobile phone; and the base station uses the reported beam number to communicate with the mobile phone.

The beam number selection rule of the invention:

Let R(i, m) be the RSSI of the broadcast signal received by the mth antenna element in the 4 antenna elements when the base station transmits with the beam number i; the invention determines the beam number as follows:

$$i_0 = \max_i \{\Sigma_{m=1}^4 R(i,m)\}.$$

After the mobile phone reports the beam number $i_0$ to the base station, the base station will use the beam number for uplink and downlink data transmission with the mobile phone.

In addition, the invention proposes a signal processing rule for downlink and uplink data transmission using a multi-port multi-antenna element architecture. For uplink data transmitting, the invention proposes two systems: FDD (Frequency division duplex) and TDD (Time division duplex). As far as the frequency division duplex system is concerned, the carrier frequencies of uplink transmission and downlink transmission are different, so the channel responses of uplink and downlink are different. The weighting function for downlink reception cannot be used as the weighting function for uplink transmission. The invention proposes to select an element as the transmit antenna for uplink data transmission. The antenna element $m_0$ is determined as follows:

$$m_0 = \max\{R(i_0, m)\}.$$

As for the TDD system, as the uplink and downlink use the same frequency carrier, the uplink and downlink have the same frequency response, and the weighting function obtained in the uplink can be directly applied to the downlink transmission. Each antenna element is multiplied by a weighting $w_m(\omega_q)$ before transmission, and the receiving performance of the uplink receiving at the base station end can be the same as the downlink receiving performance at the mobile phone end. Therefore, in the TDD system, with respect to the uplink receiving performance of the base station, the architecture of the invention is also better than that of the single-port multi-array.

The following is a comparison between the invention and the existing mobile phone millimeter-wave antenna structure:

The existing millimeter-wave antenna structure for mobile phones include a single-port single-antenna-element structure, a single-port single-linear-antenna-array structure, a single-port multi-antenna-element structure, a single-port multi-antenna-array structure, and a multi-port multi-linear-antenna-array structure.

Figure 2A:
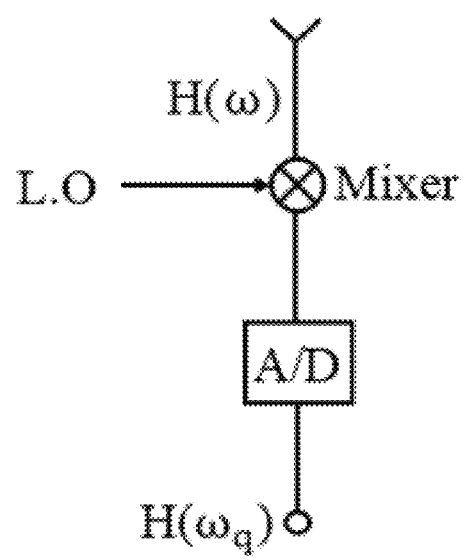
FIGS. 2a-2e show block diagrams of five existing millimeter-wave antenna structures for mobile phones.

1. The single-port single-antenna-element structure (please refer to FIG. 2a): the analog output of the antenna is denoted as $H(\omega)$, after processed by the mixer and the analog-to-digital converter, the sampled subcarrier output is denoted as $H(\omega_q)$, and $\omega_q$ is the qth subcarrier frequency.

Figure 2B:
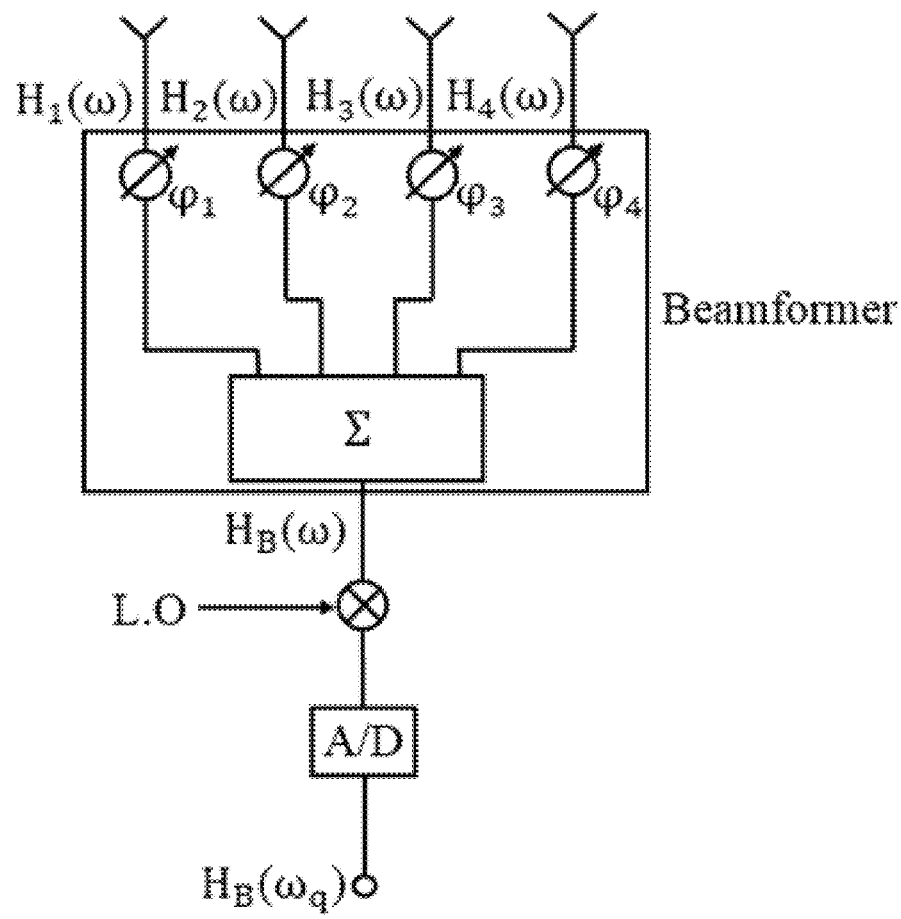

2. The single-port single-linear array structure (please refer to FIG. 2b): the linear array has four antenna elements, each antenna element is connected to a phase shifter with adjustable phase shift, the output signal of the pth element is denoted as $H_p(\omega)$, the connected phase shifter will generate a phase shift of $e^{i\varphi_{is\,p}}$, and the sum of the phase-shifted output signals of the four elements is represented as $H_B(\omega, \varphi) = \Sigma_p H_p(\omega) \cdot e^{i\varphi_p}$. For a linear array, $\varphi_p = (p-1)\varphi$, $\varphi$ is the phase angle to be found. For a narrow-band system, $\varphi_0$ is the phase angle corresponding to the maximum output, that is, $\varphi_0 = \max_\varphi \{H_B(\omega, \varphi)\}$. As for a wide-band system, different subcarriers may have different values of $\varphi_0$, so $\varphi_0$ is determined by the average power, that is, $\varphi_0 = \max_\varphi \{|H_B(\omega, \varphi)|^2\}$. The operation of multiplying the output of each antenna element by a phase shift term and summing up all the products thereof is called a beamforming operation, and the output of the beamforming operation is denoted as $H_B(\omega)$. The output of the beamforming operation at each subcarrier $\omega_q$ is denoted as $H_B(\omega_q)$ after processed by the A/D converter.

Figure 2C:
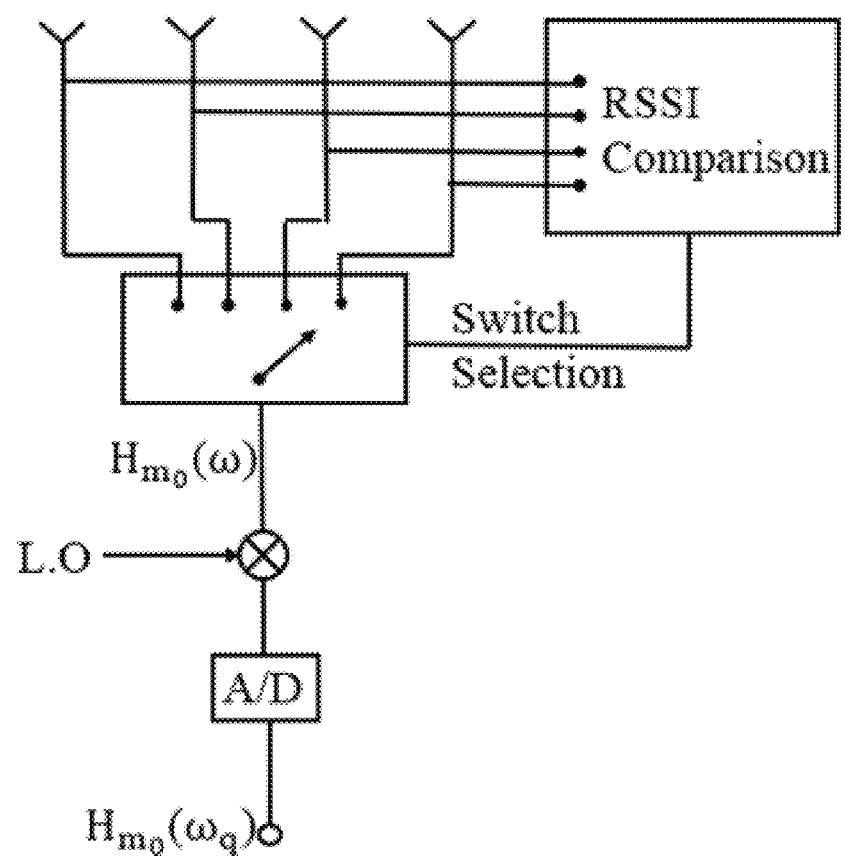

3. The single-port multi-antenna-element structure (please refer to FIG. 2c): the output of the mth element is denoted as $H_m(\omega)$, this structure compares the output average power of all elements, and selects the element $m_0$ with the maximum average power, that is $m_0 = \max_m\{|H_m(\omega)|^2\}$, as the only element for data transmission in the future, and the output after A/D conversion is denoted as $H_{m_0}(\omega_q)$.

Figure 2D:
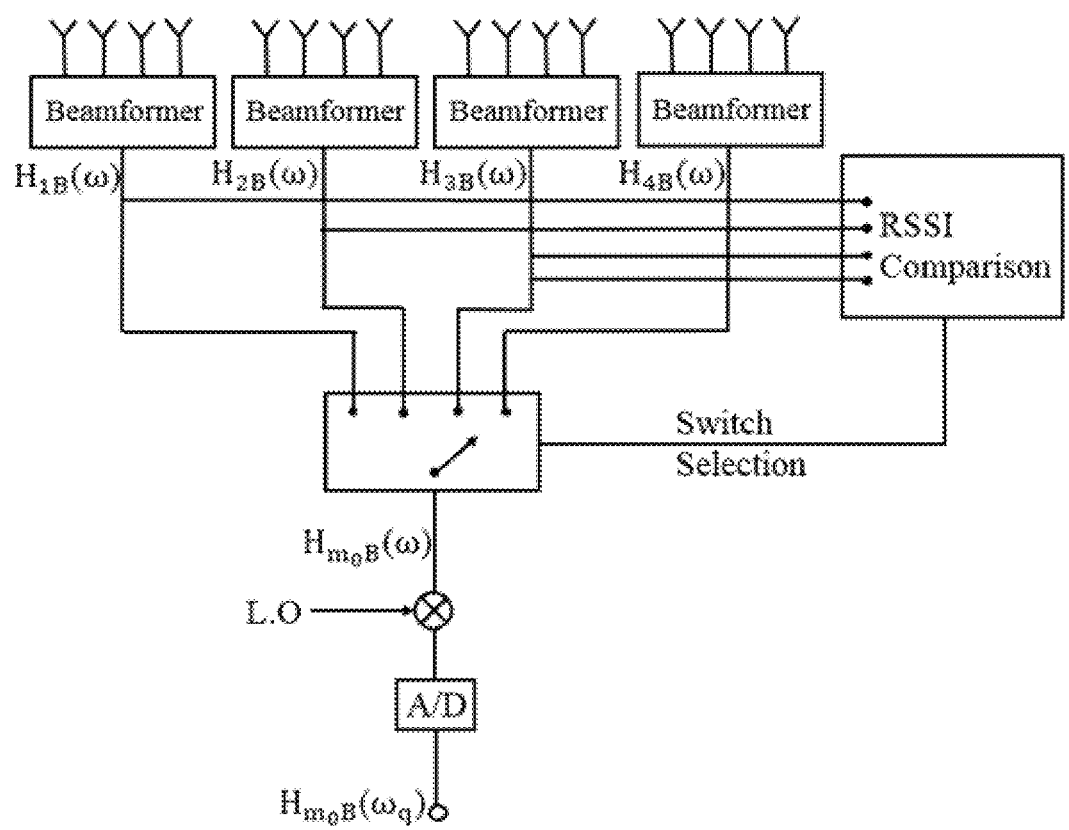

4. The single-port multi-antenna-array structure (please refer to FIG. 2d): the output of the mth array after undergoing a beamforming operation is denoted as $H_{mB}(\omega)$; the structure compares the average power $\overline{|H_{mB}(\omega)|^2}$ output by each array, selects the array with the largest average power, denoted as $m_0$, $m_0 = \max_m\{\overline{|H_{mB}(\omega)|^2}\}$, and the $m_0$ array will be used as the only array for future data transmission. After passing through the A/D converter, the antenna structure delivers an output denoted as $H_{m_oB}(\omega_q)$.

Figure 2E:
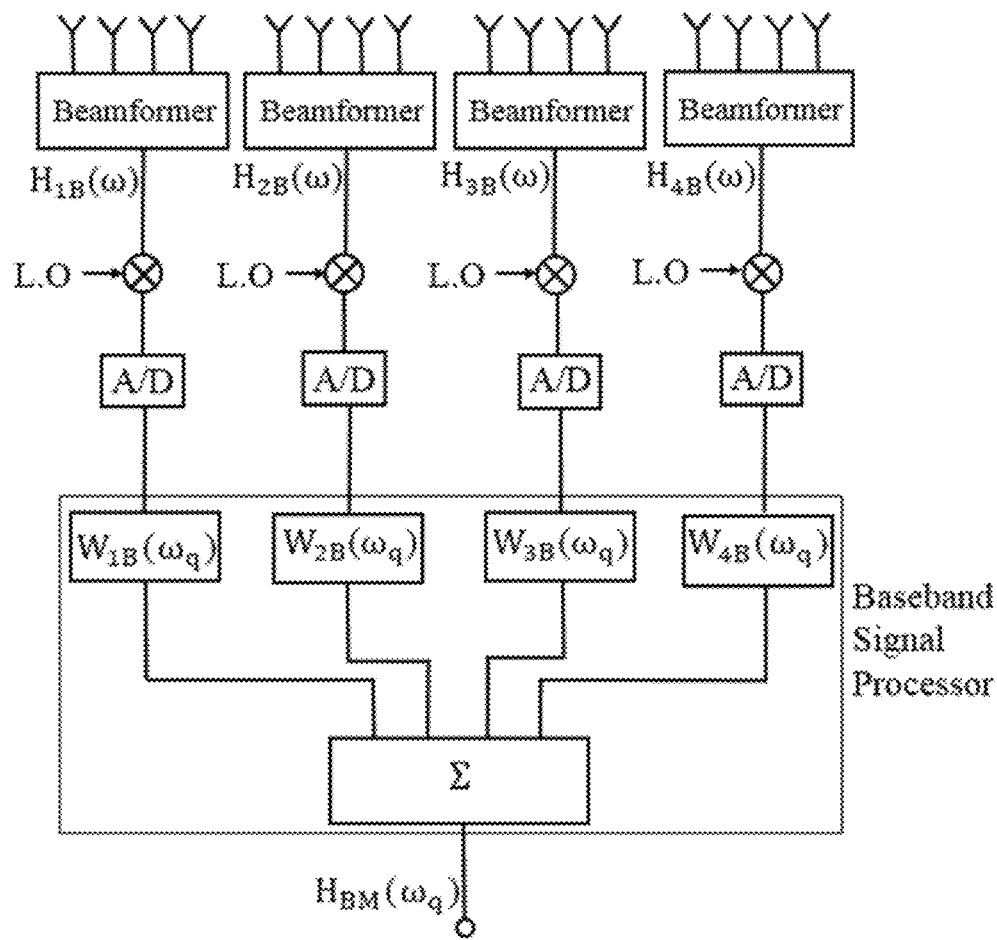

5. Multi-port multi-array structure (please refer to FIG. 2e): there are M ports and M beamforming arrays, and the output of the mth array after undergoing a beamforming operation is denoted as $H_{mB}(\omega)$; after processed by an A/D converter, $H_{mB}(\omega_q)$ is generated and fed to the baseband signal processor, and the $H_{mB}(\omega_q)$ of each port is multiplied by $W_m(\omega_q)$, and the final total output signal is $H_{BM}(\omega_q) = \Sigma_m W_m(\omega_q) \cdot H_{mB}(\omega_q)$.

Different antenna structures have different complexities, and also have different transmission performances, especially in indoor multi-path wave environments and in millimeter-wave frequency bands, where signals have characteristics of relatively large bandwidth.

Receiving Characteristics of Different Antenna Structures of Millimeter Wave Mobile Phones Ray-tracing technology is the main tool for studying the characteristics of indoor or outdoor radio wave propagation. Given the size of a room, placement locations and materials of furniture items in the room, and locations of the transmitting and receiving antennas in the room, the ray tracing technology can track the time delay, the angle of departure, the angle of arrival, and the complex amplitude of the path wave.

Figure 3:
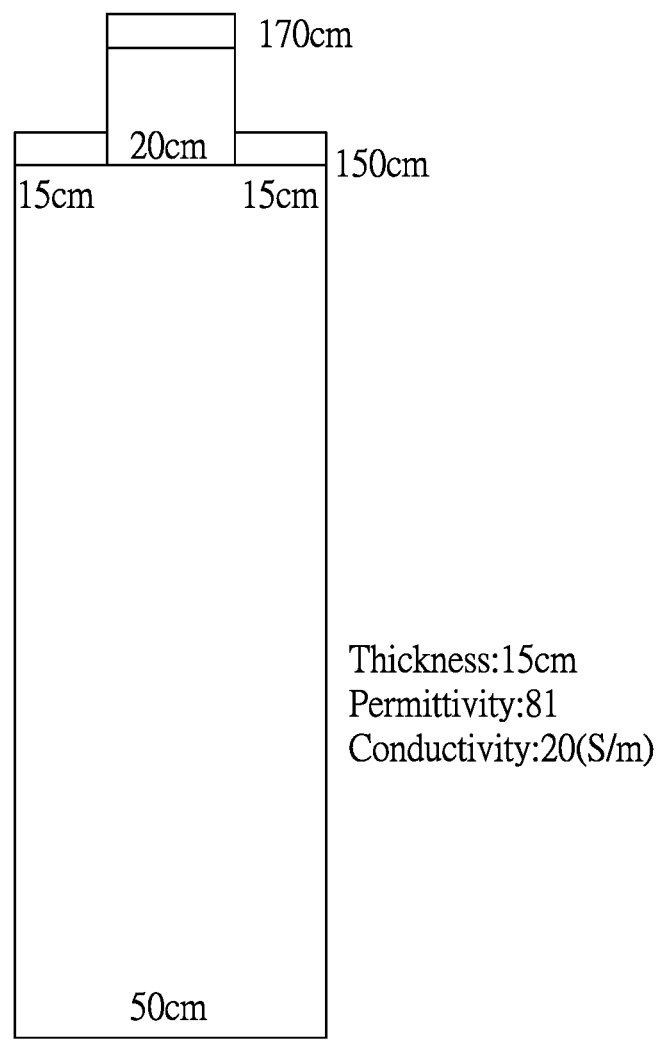
FIG. 3 is a schematic diagram of simulating a human body with a tablet model.

The use of mobile phones is often beside the human body, and the most common situations of mobile phone use are listening to calls and checking messages. The invention uses a simple flat model to simulate the human body. The size and composition of the model are shown in FIG. 3.

The focus of the invention is not on the detailed design of the antenna element. In fact, the antenna element of the invention can be a general microstrip antenna or patch antenna.

Figure 4:
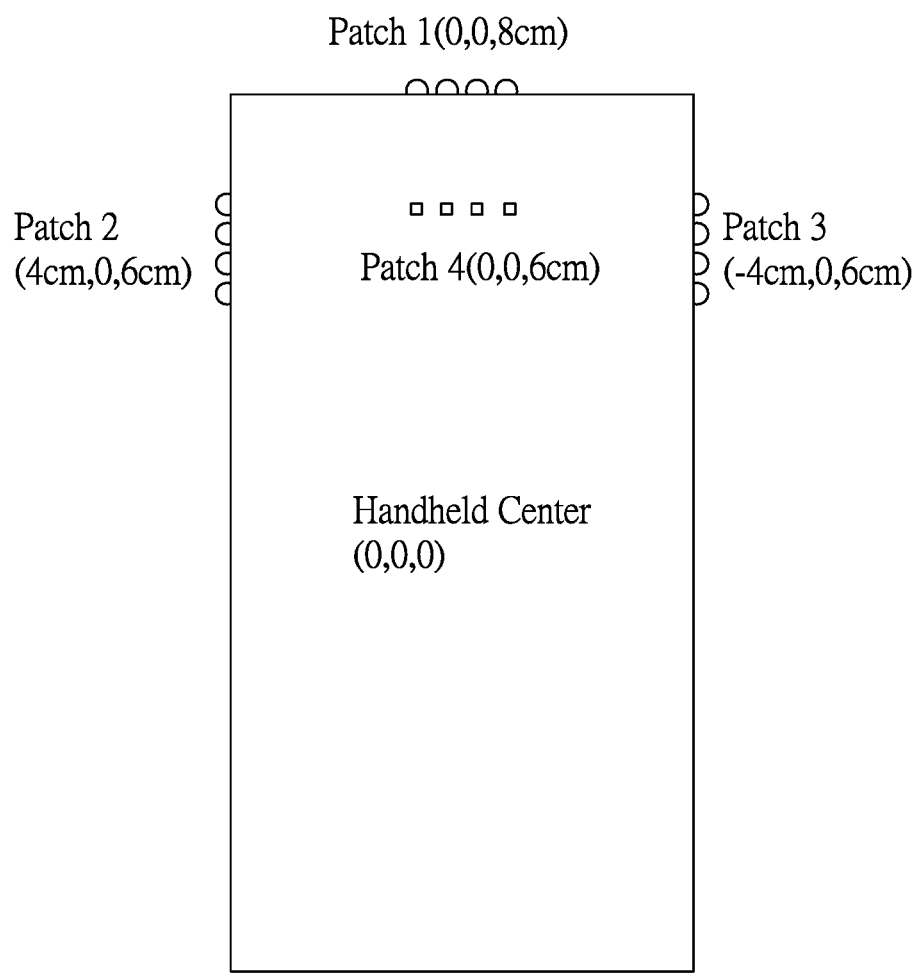
FIG. 4 is a schematic diagram of the configuration of microstrip antennas placed on different planes of the mobile phone.

The microstrip antenna can be configured in various ways. For example, it can be an antenna element, a linear array or a planar array, and it can be placed on different planes of a mobile phone as shown in FIG. 4.

In the following, the ray tracing software will be used to explore the millimeter-wave channel characteristics of different antenna structures in an indoor environment.

Figure 5:
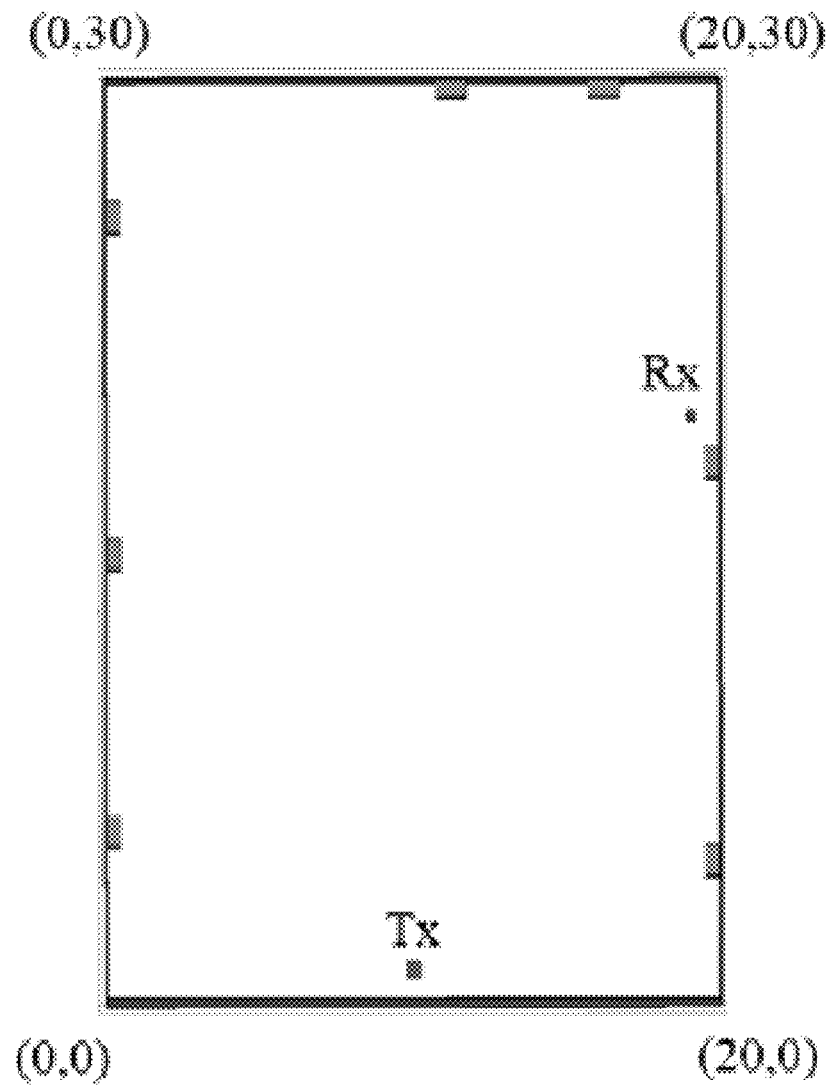
FIG. 5 is an indoor environment provided with an antenna structure.

Considering the indoor space as shown in FIG. 5, the base station is placed at the position Tx having spatial coordinates $(x_t, y_t, z_t)$, the mobile phone is located at $(x_r, y_r, z_r)$, several microstrip antenna elements are located on different surfaces of the mobile phone, Patch 1 is located on an upper part of the narrow side, Patch 2 and Patch 3 are respectively placed on the narrow surfaces of the left and right sides of the phone, and Patch 4 is placed on the circuit board on the opposite side of the screen. These four microstrip antennas have the same size, and the patch has a length of 0.35 cm, a width of 0.34 cm, a thickness of 0.1 cm, a dielectric plate with a dielectric coefficient of 2.2. The center position of the mobile phone and the relative coordinates of each patch center relative to the center of the mobile phone are also shown in the figure. The human body and the mobile phone are viewed as one object. When the human body turns to different directions, the mobile phone is rotated likewise. The software can accurately calculate the center position and radiation pattern of each antenna in any position of the human body and in any direction it faces. We can also calculate the elevation and azimuth angles of the connection line (line of sight, LOS) between the base station antenna and the mobile phone antenna. In the following simulation, the phone's tilt angle is assumed to be 30°.

Assume that the base station antenna is an 8×8 phase array antenna. The array has a fixed field pattern in the vertical direction, the maximum direction is at $\theta_0$, =90, and its antenna field pattern can be expressed as $$G(\theta, \varphi) = 64\operatorname{sinc}^2\left(\frac{s\pi}{2}\sin\theta(\cos\varphi - \cos\varphi_0)\right)\operatorname{sinc}^2\left(\frac{s\pi}{2}\cos\theta\right)P_e(\theta, \varphi).$$

Where $\varphi_0$ is the azimuth angle to be aligned, $P_e(\theta, \varphi)$ is the field pattern of the array antenna element. If $$\varphi_0 = \varphi_i = \frac{i\pi}{2M},$$

i=1, . . . ,2M, the corresponding field pattern of $\varphi_i$ is determined by beam number i, the antenna array can use different beam number i to communicate with the mobile phone. The mobile phone can choose the best beam number i and report it to the base station. After that, the base station uses this beam number to communicate with the mobile phone. The rules for selecting beam numbers for different mobile phone antenna structures are briefly described as follows.

The Selection Rule of the Beam Number

In the millimeter wave mobile communication system, the base station usually uses a broadcast channel, and sequentially uses different beam numbers to transmit the broadcast signal to the user, the user measures the RSSI (Radio Signal Strength Indicator) of the broadcast signal, and reports the beam number having the strongest RSSI to the base station, and the base station uses that beam number to communicate with the mobile phone. Therefore, the first task between the mobile phone and the base station is to determine the beam number for the base station to transmit the broadcast signal to the mobile phone.

The RSSI can be measured in real time. The signal bandwidth of the broadcast signal is much smaller than the bandwidth of the data signal. To simulate the RSSI of the broadcast signal, the average power of the channel response over the bandwidth of the broadcast signal can be used to approximate the RSSI:

$$\text{RSSI} \cong \overline{|H(\omega_q)|^2}.$$

It is assumed that the phase antenna array of the base station will change the beam number sequentially, so that the main beam can be changed to have 2M different directions sequentially, where M is the number of antenna elements in the horizontal orientation, the phase angle $\varphi_i$ corresponding to the i-th direction is $$\varphi_i = \frac{i\pi}{2M},$$

i=1,2, . . . 2M, for each steering phase angle $\varphi_i$, the invention can use the ray tracing software to obtain the channel response of each antenna element of the mobile phone.

The beam number selection rules for different antenna structures of the mobile phone are briefly described as follows:

a). The Single-Port Single-Element Structure

Let the single element be Patch m, m=1,2,3,4. When the ith beam number is launched, the RSSI measured by Patch m is denoted as R(i, m), and the beam number to be selected by the mobile phone is denoted as $i_{0m}$, the value of $i_{0m}$ is obtained by the following formula:

$$i_{0m} = \max_i\{R(i,m)\}, m=1,2,3,4°$$

b). Single-Port Single-Array Structure:

The single-array can be an array m that includes plural pieces of the Patch m, m=1, 2,3,4, the frequency response of the pth element of the array m for beam number i is denoted as $H_{mp}(i, \omega)$, p=1, 2,3,4, and the output value of the array after undergoing the beamforming operation to the phase $\varphi_s$ is $$H_{Bm}(i, \omega, \varphi_s) = \frac{1}{\sqrt{4}}\sum H_{mp}(i, \omega)\exp(jp\varphi_s),$$

$$\varphi_s = \frac{s\pi}{8}, s = 1, \ldots, 8.$$

Let $R_m(i,s)$ be the response value of the array m when the beam number is i, and the beamforming operation be for the sth phase angle. Define the value of $(i_{0m}, s_{0m})$ as the following formula:

$$i_{0m}, s_{0m} = \max_{i,s}\{R_m(i,s)\},$$

then $i_{0m}$ is the beam number to be selected by the array m, and $s_{0m}$ is the phase angle to be selected by the array m for beamforming, and for uplink data transmission.

c). Single-Port Multi-Element Structure

Let R(i, m) be the measured RSSI for the beam number i. Unlike the structure (a), this structure uses all the four patches, and the beam number $i_0$ and the Patch code $m_0$ are determined by the following formula:

$$i_0, m_0 = \max_{i,m}\{R(i,m)\}.$$

Then the Patch $m_0$ will be the element used for uplink and downlink data communication.

d). Single-Port Multi-Array Structure

Each Patch array has four elements, so that is the frequency response of the p-th element of the m-th array when the beam number is i, and when the m-th array uses the phase angle to do the beamforming output value as follows $$H_{Bms}(i, \omega) = \frac{1}{\sqrt{4}} \sum_p H_{mp}(i, \omega) \exp(jp\varphi_s),$$

$$\varphi_s = \frac{s\pi}{8}, s = 1, \ldots, 8;$$

Let R(i, m, s) be the measured RSSI when the beam number i, the m-th array, and the s-th phase angle are used for beamforming, then the selected beam number, array code and phase angle code are determined by $$i_0, m_0, s_0 = \max_{i,m,s}\{R(i,m,s)\}.$$

The $m_0$-th array and the corresponding phase angle code $s_0$ will be used as the array and phase code for uplink and downlink data communication.

e). The Multi-Port Multi-Element Structure Adopted in the Invention

Let $H_m(i, \omega)$ be the channel response of the mth Patch element when the beam number is i, and the selected beam number is determined by the following formula:

$$i_0 = \max_i\{\Sigma_{m=1}^{4} R(i,m)\}.$$

When used for reception in downlink data transmission, all elements are used for data receiving; when used for uplink transmission, if it is a TDD (Time division duplex) system, the uplink and downlink use the same carrier frequency, and the uplink and downlink have the same channel response, all antenna elements are used for data transmission; but in the FDD (Frequency division duplex) system, as the uplink and downlink carrier frequencies are different, the uplink and downlink channel responses are different, only one element can be used for uplink data transmission, and which element is used to transmit the uplink data signal is determined by the following formula $$m_0 = \max_m\{R(i_0, m)\}.$$

f). Multi-Port Multi-Array Structure

The definitions of some symbols are the same as (d), and let $s_{0im}$ be $$s_{0im} = \max_s\{R(i,m,s)\},$$

then $R(i,m,s_{0im})$ is the RSSI value when the beam number is i, and the mth array is beamformed to the phase angle $s_{0im}$, so that $$R_{iT} = \Sigma_{m=1}^{4} R(i,m,s_{0im}).$$

The selected beam number $i_0$ is determined by the following formula:

$$i_0 = \max_i\{R_{iT}\}.$$

When used for downlink data transmission, $s_{0im}$ is used as the phase code of the mth array for the beamforming operation, and all four arrays are used for data receiving. When used for uplink data transmission, if it is a TDD system, all four arrays are used as transmitting antennas; if it is an FDD system, only one array is selected to transmit the data signal, and the array code is determined by the following formula:

$$m_0 = \max_m\{R(i_0, m, s_{0im})\}.$$

After the beam number, element/array code and phase angle code are determined, the calculation of the output values of the various antenna structures are illustrated as follows:

a). The Single-Port Single-Element Structure

Let $H_m(i, \omega_q)$ be the channel response of Patch m when the beam number is i, then the output value of Patch m is $$y_m(\omega_q) = H_m(i_0, \omega_q).$$

b). Single-Port Single-Array Structure

Let $H_{mp}(i, \omega_q)$ be he channel response of the pth element of the m-th array when the beam number is i, then the output value of the m-th array is $$y_{Bm}(\omega_q) = \frac{1}{\sqrt{4}} \sum_{p=1}^{4} H_{mp}(i_{0m}, \omega_q) \exp(jp\varphi_{s_0 m}).$$

c). Single-Port Multi-Element Structure

The output value of the system is $$y_0(\omega_q) = H_{m_0}(i_{0m_0}, \omega_q).$$

d). Single-Port Multi-Array Structure $$y_{B0}(\omega_q) = \frac{1}{\sqrt{4}} \sum_{p=1}^{4} H_{m_0 p}(\omega_q) \exp(jp\varphi_{s_0 m_0}).$$

e). The Multi-Port Multi-Element Structure Adopted by the Invention

Let $W_m(\omega_q)$ be the weighting function of the m-th element when the subcarrier frequency is $\omega_q$. When applying the MRC (Maximum Ratio Combining) rule, the weighting function $W_m(\omega_q)$ is as follows:

$$w_m(\omega_q) = H_m^*(i_0, \omega_q) / (\Sigma_{m=1}^{4} |H_m(i_0, \omega_q)|^2)^{1/2},$$

and the output value after MRC is $$y_M(\omega_0) = \Sigma_{m=1}^{4} w_m(\omega_q) H_m(i_0, \omega_q) = (\Sigma_{m=1}^{4} |H_m(i_0, \omega_q)|^2)^{1/2},$$

In the TDD system, as the uplink and downlink use the same carrier frequency, they also have the same channel response. When used for uplink data transmission, the four elements are used as transmitting antennas, and each element is multiplied by the abovementioned weighting function. The uplink reception of the base station antenna also has the abovementioned output value.

f). Multi-Port Multi-Array Architecture

The weighting function of the mth array is $$w_m(\omega_q) = H_{Bm}^*(i_0, \omega_q) / (\Sigma_{m=1}^{4} |H_{Bm}(i_0, \omega_q)|^2)^{1/2},$$

where $$H_{Bm}(i_0, \omega_q) = \frac{1}{\sqrt{4}} \sum_{p=1}^{4} H_{Bp}(i_0, \omega_q) \exp(jp\varphi_{s_0 m}),$$

and the final total output signal is $$y_{BM}(\omega_q) = \Sigma_{m=1}^{4} w_m(\omega_0)$$
$$H_{Bm}(i_0, \omega_q) = (\Sigma_{m=1}^{4} |H_{Bm}(i_0, \omega_q)|^2)^{1/2},$$

In the TDD system, when used for uplink data transmission, all four arrays are used as transmitting antennas at the same time, and each array is multiplied by the abovementioned weighting function. The uplink reception response of the base station is also as that mentioned above.

Simulation Results

Let the antenna of the base station be placed at ($x_t$=10m, $y_t$=1m,$z_t$=2.5m), the center position of the mobile phone is ($x_r$=16m,$y_r$=5m,$z_r$=1.3m), and the inclination angle of the mobile phone is 30°.

Table 1 shows the simulation results of using the ray tracing software to simulate the scenario that the indoor base station transmits the broadcast signal to the mobile phone, and the mobile phone uses the measured RSSI of various antenna structures to select the beam number, element/array code and phase angle code. There are two angles that the human body faces: one is facing the base station, where the LOS is not blocked by the human body; and the other is facing away from the base station, where the LOS is blocked by the human body. The results in Table 1 show that when the LOS is not blocked by the human body, the beam numbers selected by various antenna architectures are 2 or 3, and the direction angles corresponding to these two beam numbers are closest to the azimuth angle of the direct wave. When the LOS is blocked, the beam numbers selected by each element code and array code are then not the same, and the selected beam number is not the same as the selected beam number when the LOS is not blocked.

TABLE 1

|  |  |  | LOS clear | | LOS Obstructed | |
| --- | --- | --- | --- | --- | --- | --- |
|  |  |  | beam no ($i_0$) | Patch type ($m_0$) phase angle no ($p_0$) | beam no ($i_0$) | Patch type ($m_0$) phase angle no ($p_0$) |
| Single port | Patch 1 | element | 2 | $m_0$ = 1 | 1 | $m_0$ = 1 |
|  |  | array | 2 | $m_0$ = 1 $p_0$ = 1 | 10 | $m_0$ = 1 $p_0$ = 8 |
|  | Patch 2 | element | 3 | $m_0$ = 2 | 2 | $m_0$ = 2 |
|  |  | array | 2 | $m_0$ = 2 $p_0$ = 1 | 2 | $m_0$ = 2 $p_0$ = 3 |
|  | Patch 3 | element | 3 | $m_0$ = 3 | 2 | $m_0$ = 3 |
|  |  | array | 3 | $m_0$ = 3 $p_0$ = 1 | 2 | $m_0$ = 3 $p_0$ = 3 |
|  | Patch 4 | element | 2 | $m_0$ = 4 | 10 | $m_0$ = 4 |
|  |  | array | 2 | $m_0$ = 4 $p_0$ = 1 | 10 | $m_0$ = 4 $p_0$ = 8 |
|  | multiple | element | 3 | $m_0$ = 3 | 2 | $m_0$ = 2 |
|  |  | array | 2 | $m_0$ = 1 $p_0$ = 1 | 2 | $m_0$ = 2 $p_0$ = 3 |
| Multi-port | multiple | element | 3 | $m_0$ = 3 | 2 | $m_0$ = 2 |
|  |  | array | 2 | $m_0$ = 1 $p_0$ = 1 | 2 | $m_0$ = 2 $p_0$ = 7 |

Once the beam number is selected, the base station will use the corresponding beam to transmit data to the mobile phone, and the mobile phone will use the corresponding elements/arrays and phase angle codes for downlink data reception and uplink data transmission. FIG. 6a to FIG. 6g illustrate the frequency responses of propagation loss during downlink reception with different antenna structures. Looking closely at these frequency responses, it can be found that, regardless of whether the LOS is blocked or not, the propagation loss response performance of the array structure is not necessarily better than that of the element structure. For some patch types, the performance of the element structure is better than that of the array structure; in some cases, the performance of the array structure is better than that of the element structure; and in some cases, the performance of the two is similar. In other words, in an indoor environment, the transmission performance of the array structure after undergoing a beamforming operation is not necessarily better than that of a single element. The beamforming operation can enhance the signal, but it does so only if there is a dominant incoming wave. When there are many path waves coming from different directions, the function of beamforming operation can be greatly reduced.

On the other hand, it can be found that the multi-port multi-element/multi-array structure can effectively improve the transmission performance after undergoing the MRC, and it does not need to decide which element and which array for signal receiving. According to the principle of MRC, it can be proved that after undergoing the MRC operation, the SNR (signal to noise ratio) of the total output is the sum of the SNRs of individual ports.

Figure 6A:
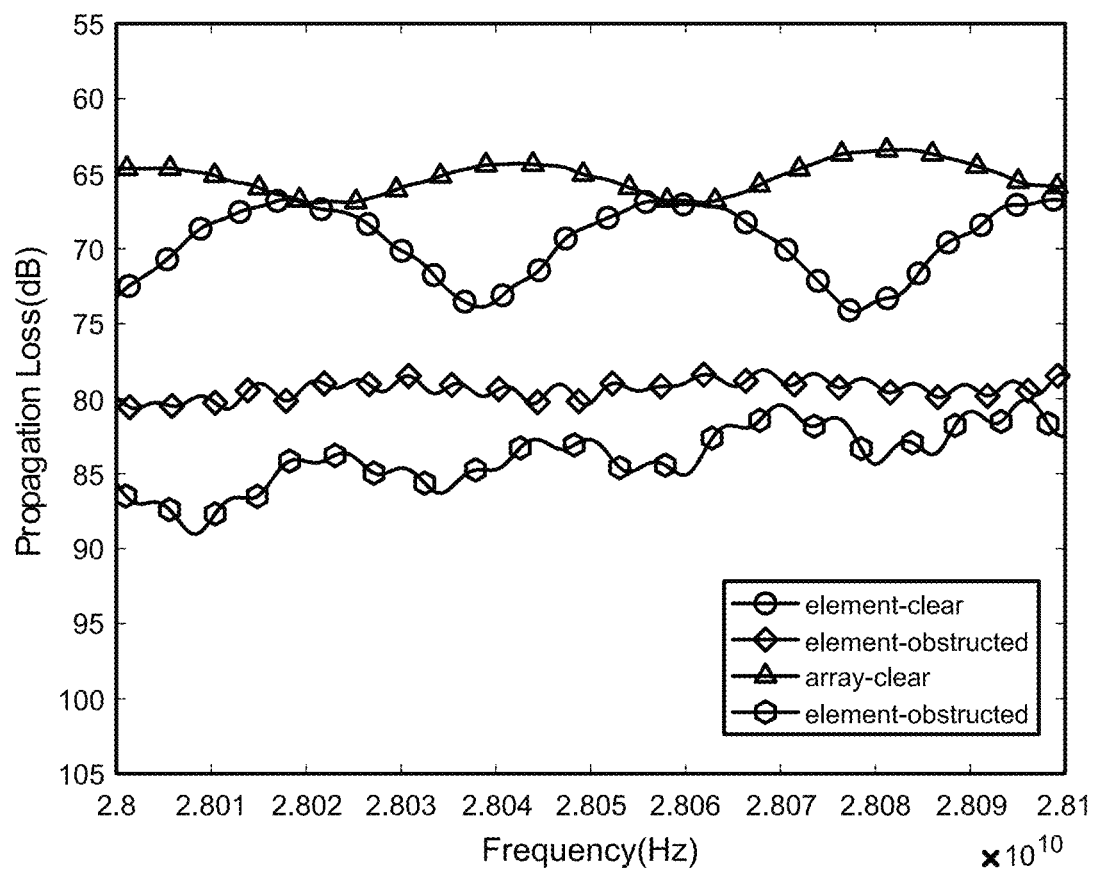
FIGS. 6a-6g illustrate the frequency response diagrams of propagation loss in downlink reception with different antenna architectures.
Figure 6B:
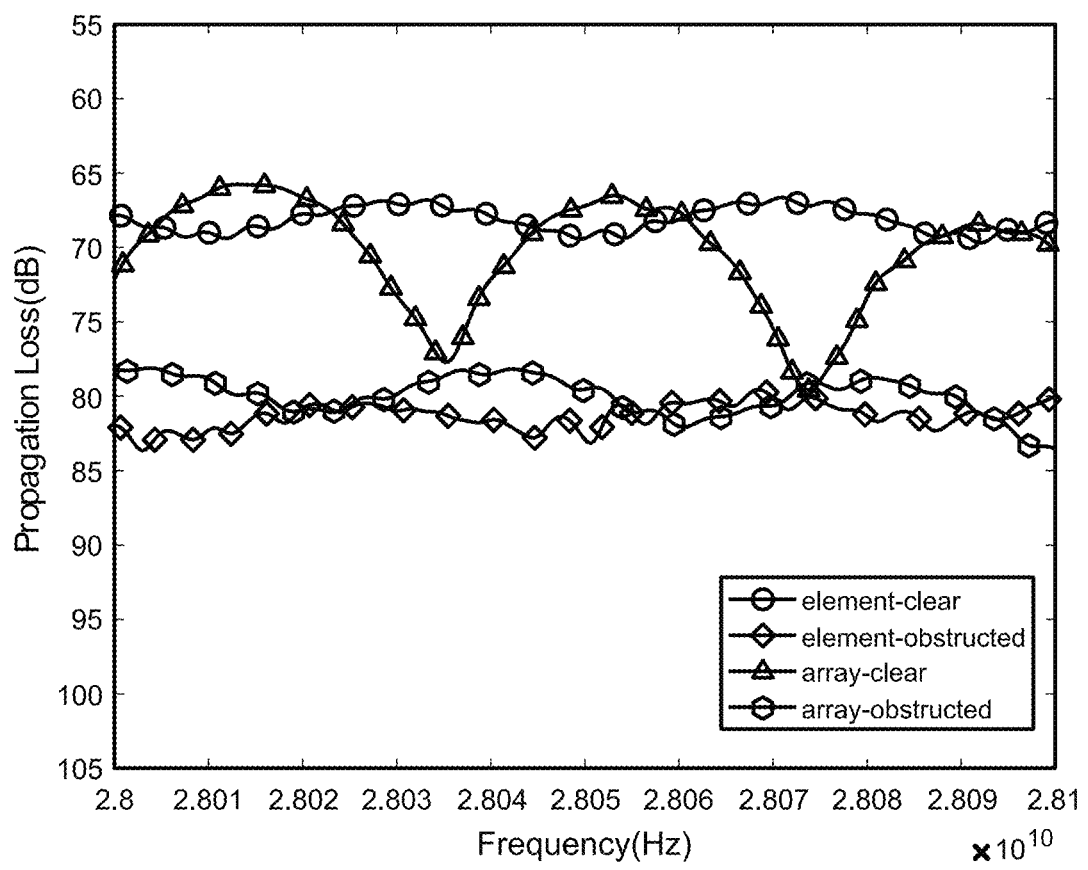
Figure 6C:
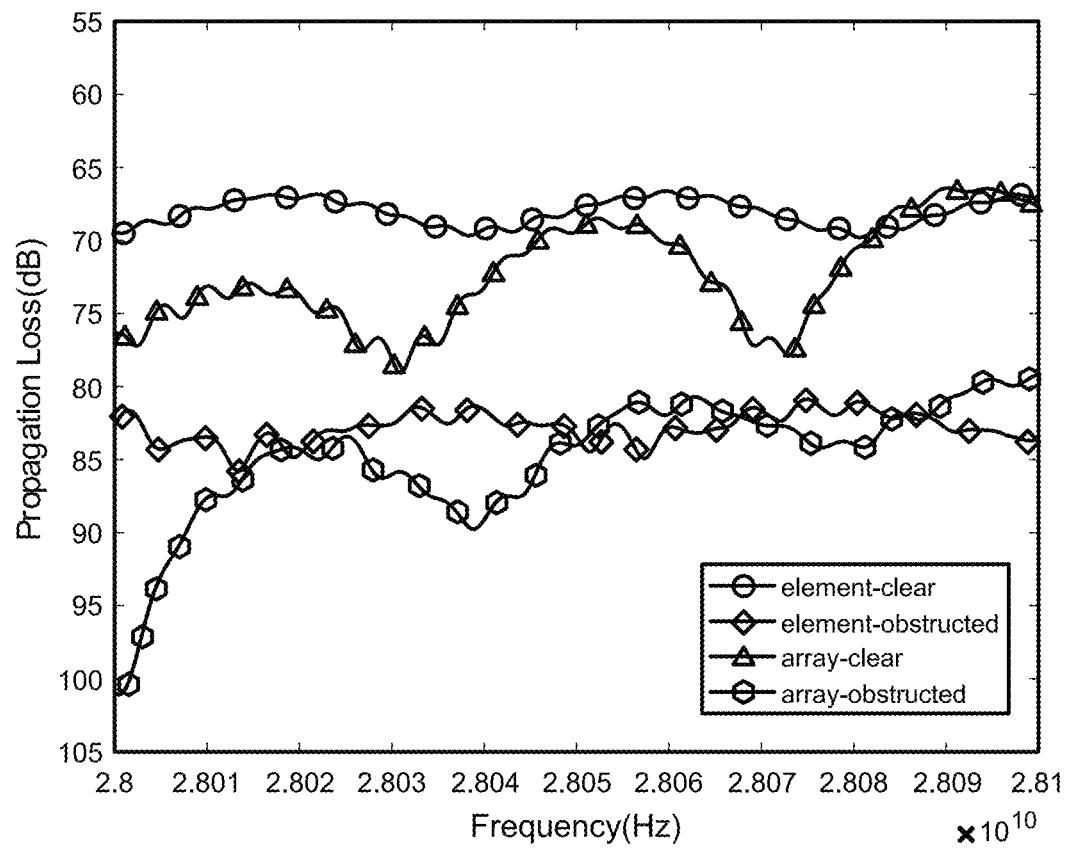
Figure 6D:
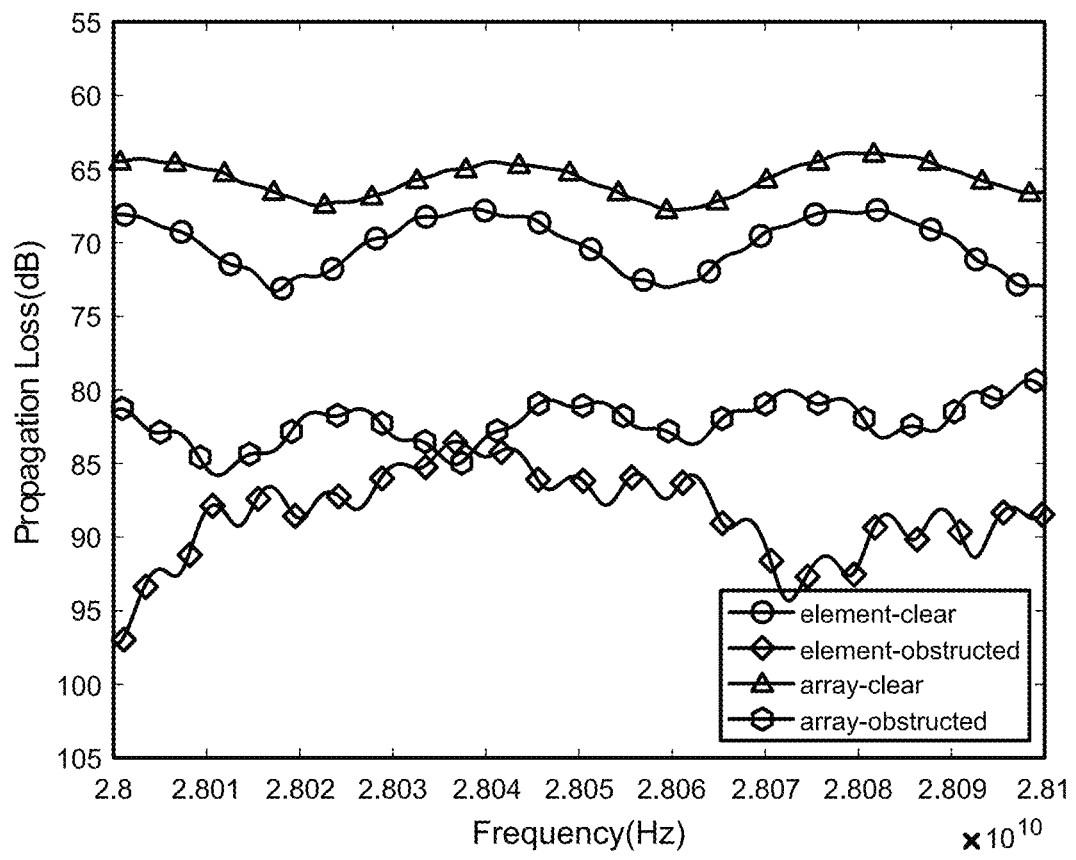
Figure 6E:
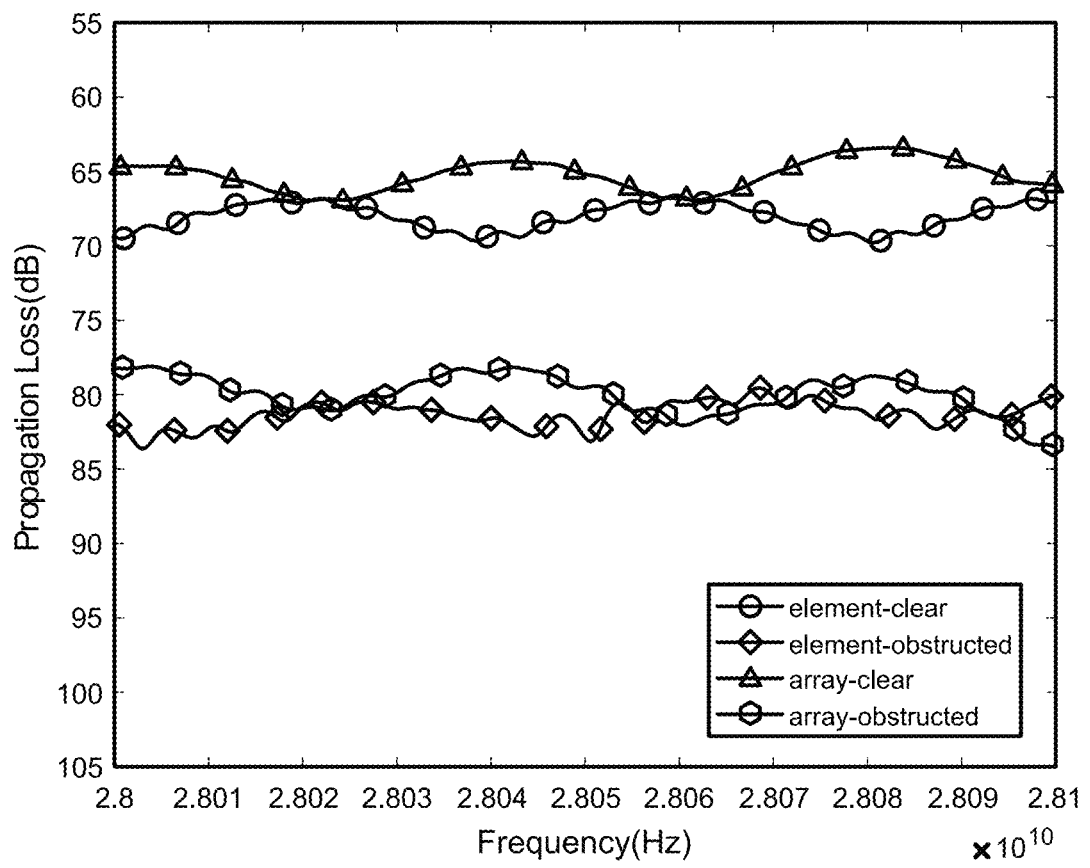
Figure 6F:
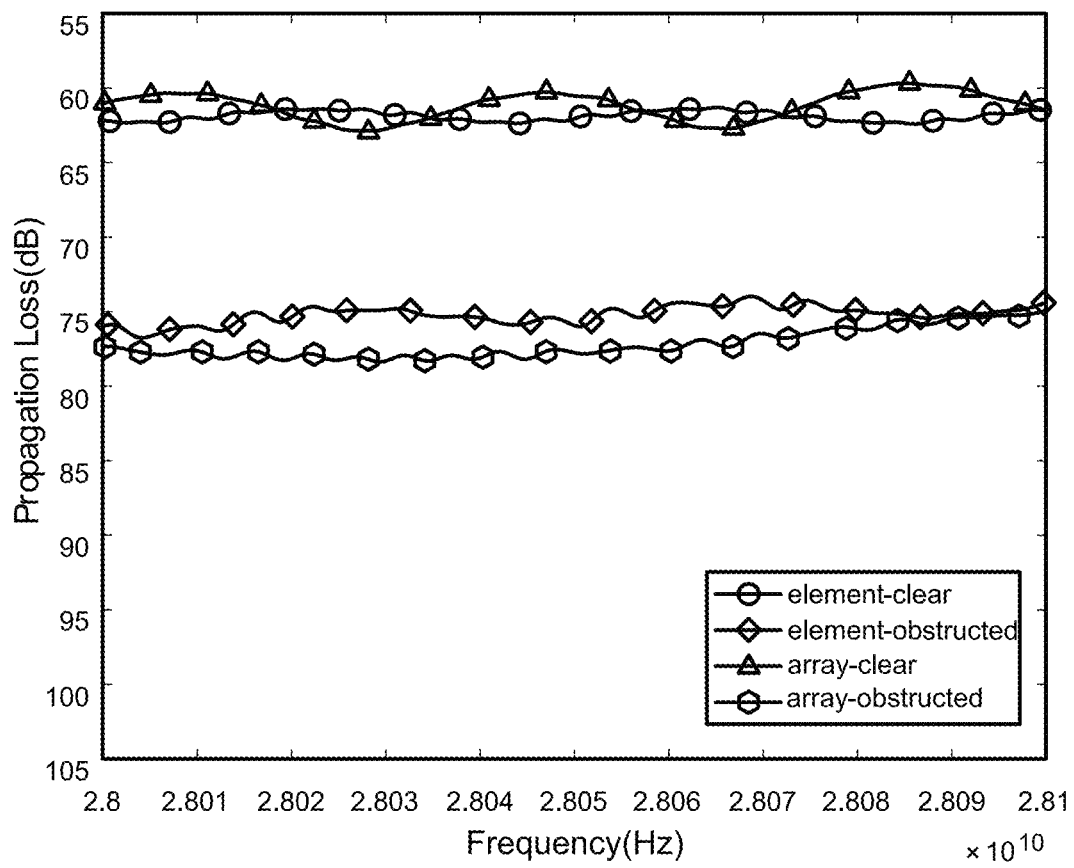
Figure 6G:
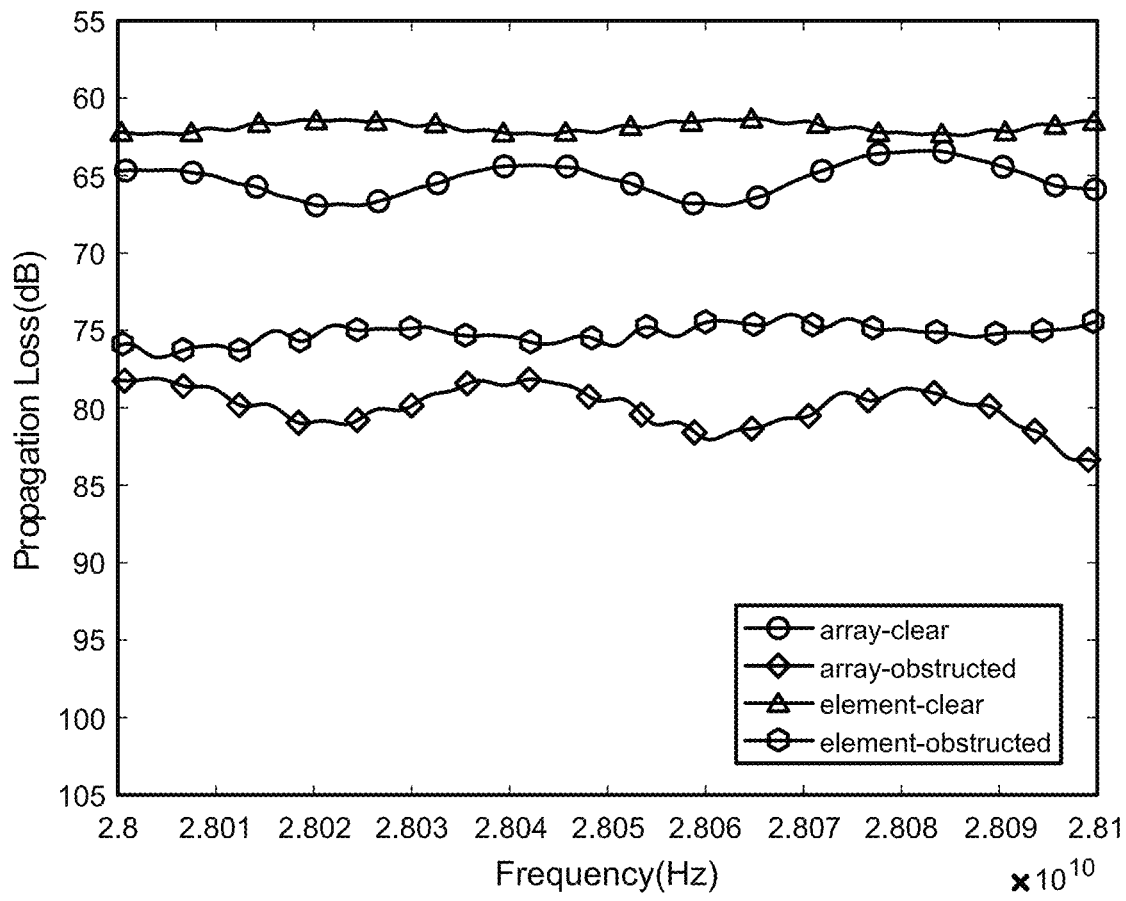

To more clearly compare the propagation loss response of the multi-port multi-element structure of the invention with that of the existing single-port multi-array structure, we extracts the corresponding curves from FIG. 6e and FIG. 6f, and draw the two together in FIG. 6g for comparison. As can be seen from FIG. 6g, the performance of the multi-port multi-element structure is better than that of the existing single-port multi-array structure.

In addition, the selection of beam number, element code/array code and phase angle code is determined based on the measured RSSI, because the bandwidth of the broadcast signal is much smaller than the bandwidth of the data signal. In the indoor environment, multipath waves arriving at different times from different directions will interfere with each other, and sometimes there will be serious attenuation over the frequency span. As the measured value of RSSI can only represent the radio wave intensity within the broadcast signal bandwidth, but cannot reflect the performance of the entire data signal bandwidth, the selected beam number, element code/array code and phase angle code are not necessarily the best choices. But by using a multi-port with the MRC, the serious fading phenomenon caused by multi-path waves can be effectively eliminated, making the level of the total output relatively stable.

Statistical Characteristics of Channel Responses of Different Antenna Structures Throughout the Room What we have shown above is the result of a specific position and two specific orientations (facing the base station and facing away from the base station). The characteristics of transmission performance statistics of various antenna structures in multiple locations and multiple orientations are shown below.

Figure 7:
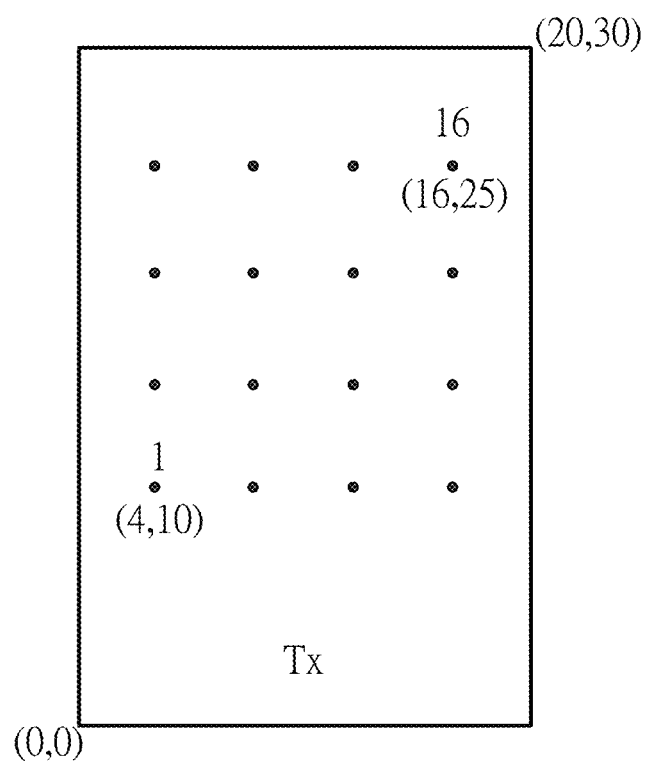
FIG. 7 shows the location distribution of users in a room.

The distribution of users in a room is shown in FIG. 7. There are 16 positions in total, and each position has six orientations. Let the spherical coordinates of the jth position to the center of the base station is denoted as ($r_j$, $\theta_j$, $\varphi_j$). When the user faces the direction $\varphi_j$, the mobile phone is blocked by the human body. When the human body faces $\varphi_j$−180°, that is, when facing the BS, the LOS is in a clear state. Due to the width of the body and the distance between the mobile phone and the human body, when the human body faces within the range of $\varphi_j$±40°, the LOS will be blocked by the human body, and when the human body faces other angles, LOS will not be blocked. However, when the human body faces different angles, the radiation field pattern and polarization of each patch element will also change accordingly. For each position, the human body faces six directions, which are $\varphi_j$, $\varphi_j$−20°, $\varphi_j$+30°, $\varphi_j$−70°, $\varphi_j$+80° and $\varphi_j$–180° respectively. For the first three directions, the LOS is blocked by the human body, and for the latter three directions, the LOS is not blocked by the human body.

Figure 8A:
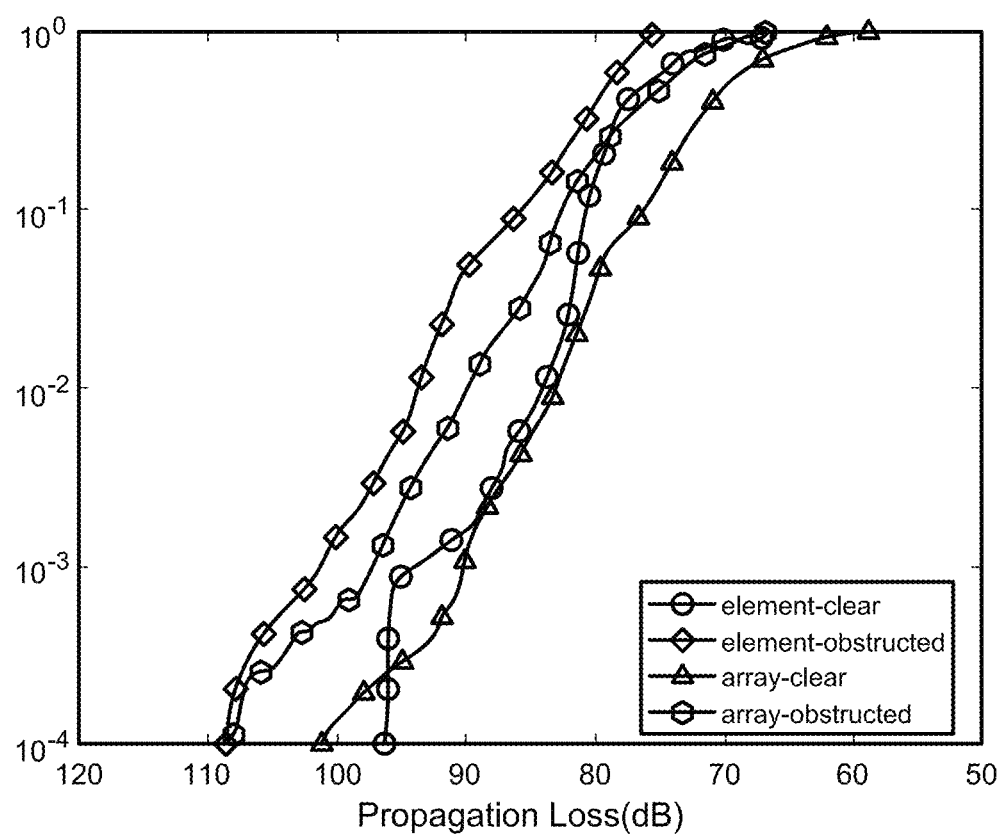
FIGS. 8a-8f show the cumulative probability distribution curves for each position and orientation in FIG. 7.
Figure 8B:
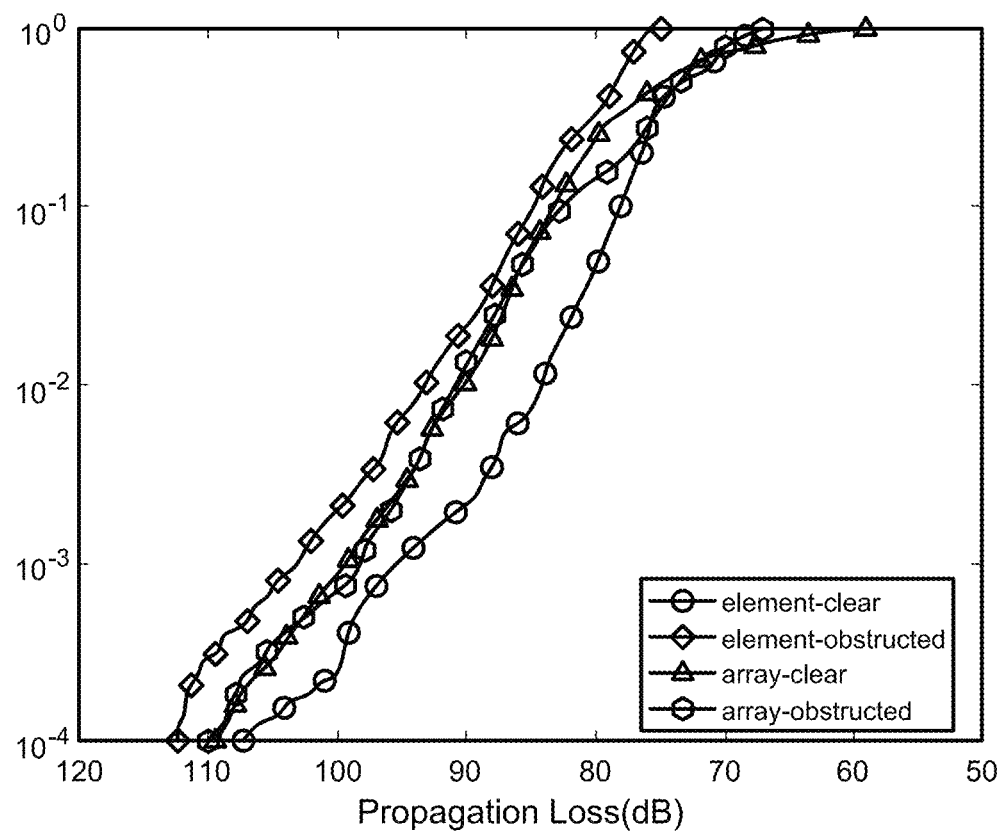
Figure 8C:
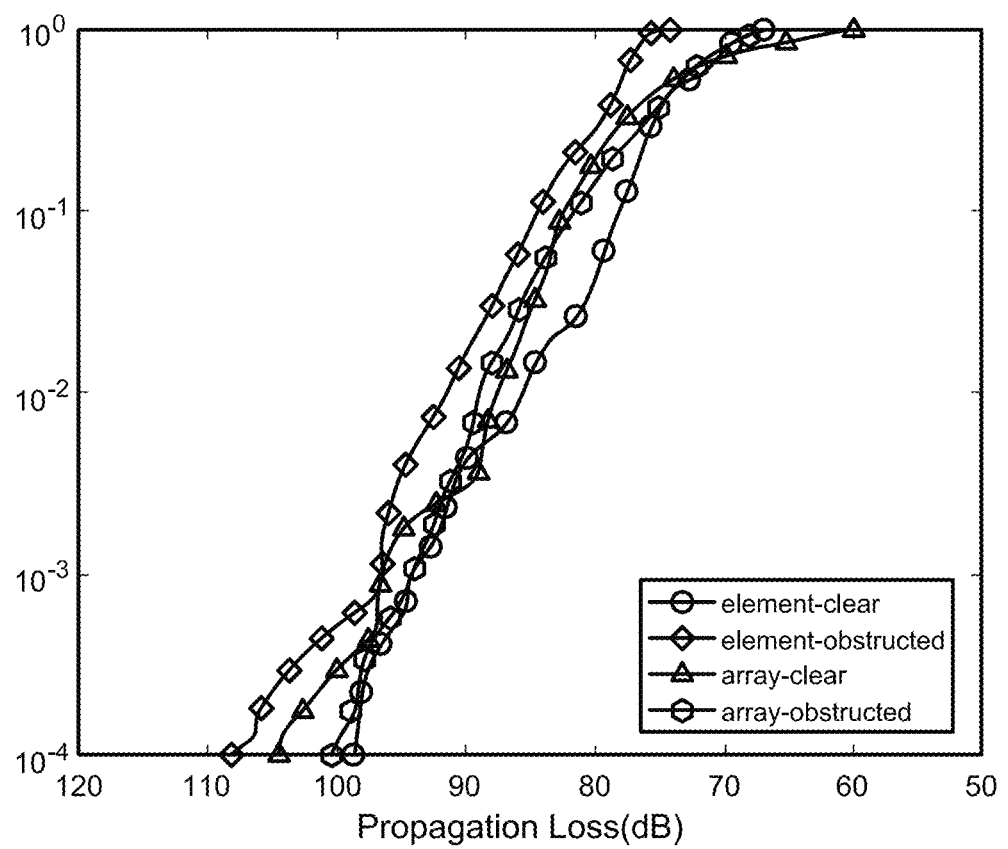
Figure 8D:
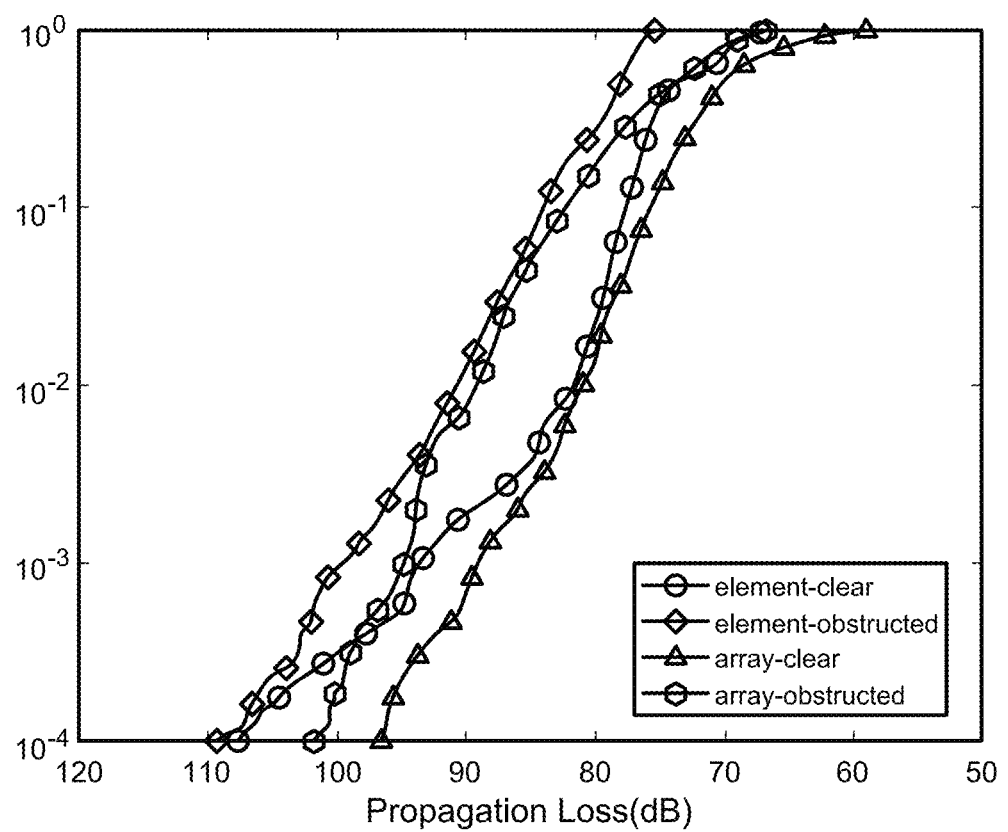
Figure 8E:
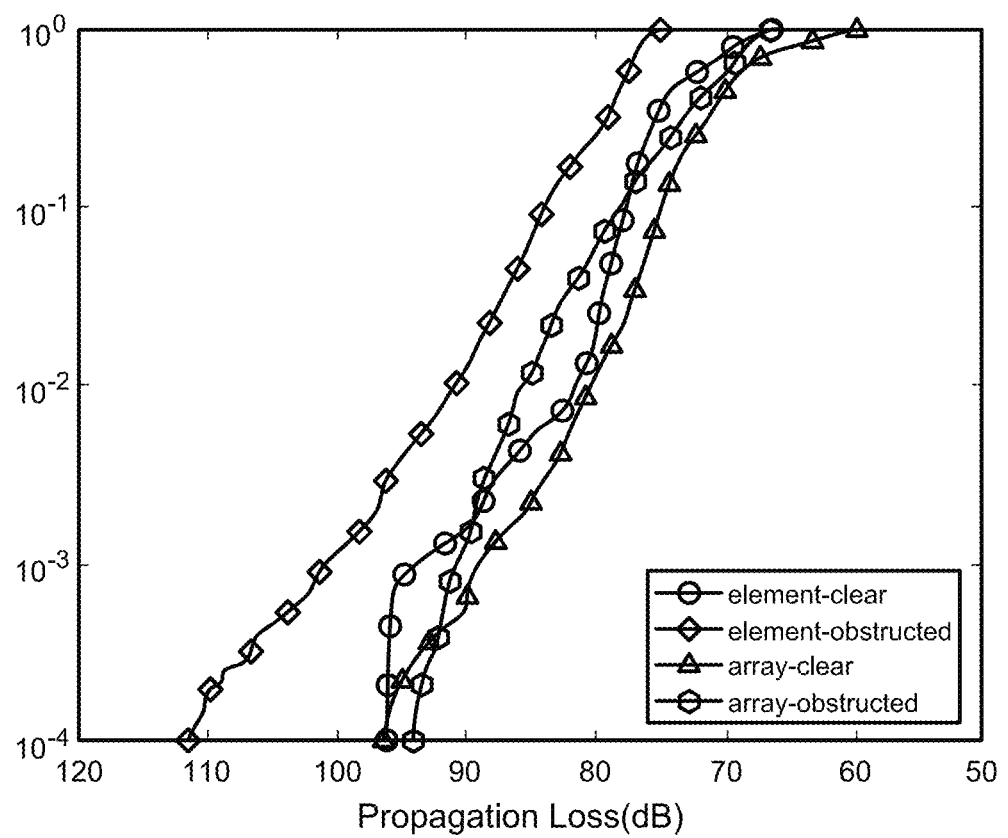
Figure 8F:
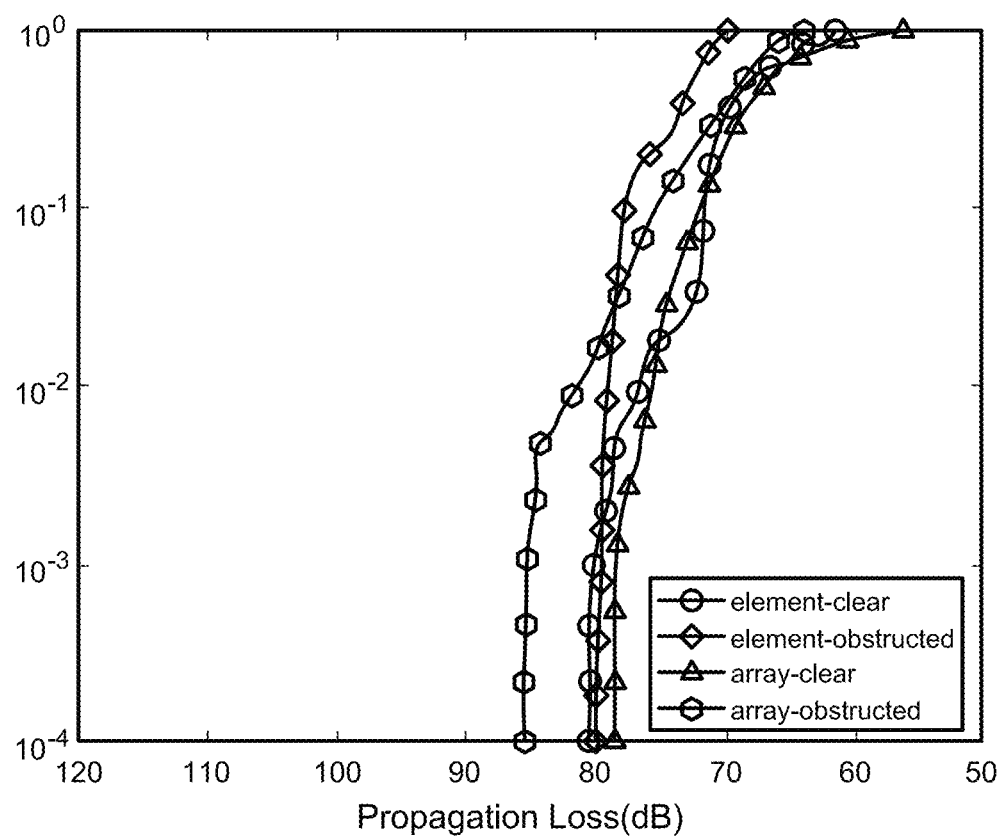
Figure 8G:
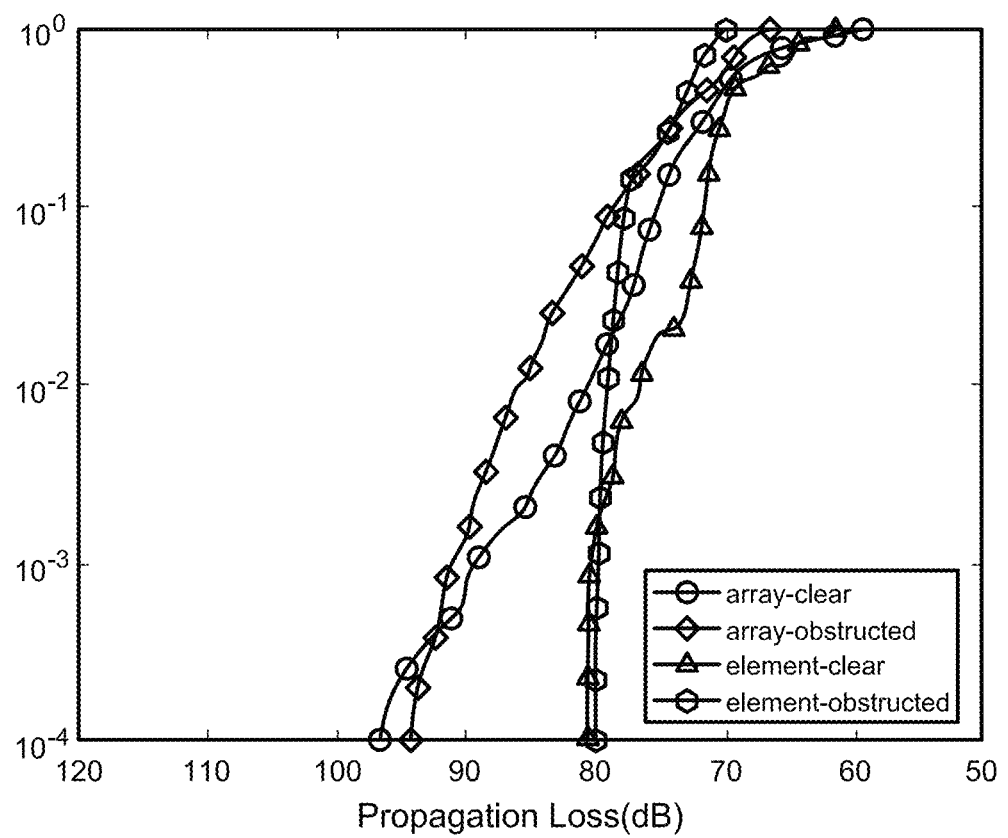
FIG. 8g shows the cumulative probability distribution curves of the single-port multi-array architecture and the multi-port multi-element architecture proposed from FIG. 8e and FIG. 8f.

For each position and each orientation, we follow the steps described above, and for each antenna structure, we first select the beam number, element code/array code, and phase angle code, and then calculate the propagation loss response of the output of various antenna structures. The 16 locations and 6 orientations are divided into two types: LOS-clear and LOS-obstructed, and the cumulative probability distribution (Cumulative Density Function, CDF) curves are drawn and the results are shown in FIG. 8a-FIG. 8f. It can be seen from the figures that the single-port single-element/single-array has a wide range of frequency response variations. Although the beam number has been selected, there are still some chances that the propagation loss is greater than 100 dB, which means that there is a serious fading phenomenon. For the single-port multi-element/multi-array, after selecting the best element or array, although the performance has been improved, there is still a certain probability that the transmission loss is higher than 95 dB when there is human body blocking. On the other hand, for the multi-port multi-element/multi-array, after undergoing the MRC operation, the variation of propagation loss is much reduced, and the propagation loss is less than 86 dB. We compared the single-port multi-array structure with the multi-port multi-element structure proposed in FIG. 8e and FIG. 8f, and the results are shown in FIG. 8g. The results show that the performance of the single-port multi-element structure is better than that of the multi-port multi-array structure. The propagation loss improves 7 dB at CDF=$10^{-2}$ and 12 dB at CDF=$10^{-3}$.

With the design disclosed above, the invention offers the following advantages:

1. Each port contains only a single patch element. A single patch element takes up little space, and the location it can be placed on is very flexible. It can be placed on the surface of the narrow side of the mobile phone and on the circuit board at the back, unlike the antenna array (including four patch elements), which has limited locations to be placed on.

2. The antenna element of the present invention is not connected to a phase shifter. At present, there are several antenna arrays in the millimeter-wave antenna structure of the mobile phone, each array is composed of four antenna elements, and each antenna element is connected with a phase shifter to change the phase. The phase shifter will cause 2-3 dB insertion loss. In addition, as the best array antenna will be selected from several antenna arrays for transmission and reception, so a selection switch is required. The selection switch will cause 1-2 dB insertion loss. The insertion loss will cause the signal level to drop, and will also generate additional heat and consume the phone battery. In contrast, the antenna structure proposed by the invention does not have this concern.

3. The invention is especially suitable for indoor environments with multi-path waves and situations where direct waves are blocked by the human body. When the direct wave is blocked by the human body and the incoming wave entering the mobile phone lacks the main wave, it is difficult for the beamforming operation of the antenna array to function, and the multi-path waves interfere with each other, which will cause the signal to attenuate at different frequencies. The invention uses the combination of multiple ports, each frequency component of each port signal is fed into the baseband signal processor after being sampled, and effectively combined at each frequency. Therefore, the attenuation phenomenon in the frequency span can be effectively eliminated.

4. The microstrip antenna element structure of the invention is suitable for the newly developed Antenna on chip technology to improve the manufacture of mobile phones.

5. The antenna structure of the invention is a multi-port structure, which can cooperate with the multi-port antenna architecture of a base station to transmit up to four groups of independent data simultaneously in a MIMO transmission mode; in contrast, the single-port multi-array antenna structure does no support MIMO transmission mode.

While the invention has been described by way of example and in terms of preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

In summation of the above description, the present invention herein enhances the performance over the conventional structure and further complies with the patent application requirements and is submitted to the Patent and Trademark Office for review and granting of the commensurate patent rights.

What is claimed is:

1. A millimeter wave mobile phone antenna structure comprising:

a plurality of antenna elements, each of which provides a port;

a plurality of mixers, each used to perform a mixing process on an output signal of one of the ports;

a plurality of analog-to-digital converters used to perform analog-to-digital conversions on the output signals of the mixers to generate a plurality of base-frequency digital signals;

a baseband signal processor having a plurality of weighting function modules and a summation function module, where the weighting function modules are used to multiply the baseband digital signals by a corresponding weighting function, and the summing function module is used to sum up the output values of the weighting function modules; and the weighting function corresponding to the m-th port is expressed as follows:

$$w_m(\omega_q) = \frac{H_m^*(\omega_q)}{\left(\sum_m |H_m(\omega_q)|^2\right)^{1/2}},$$

where $w_m(\omega_q)$ represents the weighting function, $\omega_q$ represents the qth subcarrier, $H_m(\omega_q)$ represents the channel response of the mth antenna element when the subcarrier frequency is $\omega_q$.

2. The millimeter wave mobile phone antenna structure of claim 1, wherein the antenna element is a microstrip antenna.

3. The millimeter wave mobile phone antenna structure of claim 1, wherein, the output formula of the summing function module is as follows:

$$y_0(\omega_q) = \sum_{m=1}^{M} W_m(\omega_q) \cdot y_m(\omega_q) = \left(\sum_{m=1}^{M} |H_m(\omega_q)|^2\right)^{1/2},$$

-continued $$|y_0(\omega_q)|^2 = \sum_{m=1}^{M}|H_m(\omega_q)|^2;$$

where M is a total number of ports used, and $|y_0(\omega_q)|^2$ is a final output power and is a sum of a power of each port at the subcarrier frequency $\omega_q$.

4. The millimeter wave mobile phone antenna structure of claim 1, wherein, in an application of 5G millimeter wave communication, a phase antenna array of a base station sequentially changes a beam number to change a direction of a field beam of the antenna array, and repeatedly transmits a broadcast signal to the mobile phone, the mobile phone receives RSSI (radio signal strength indicator) of the broadcast signal transmitted by different values of the beam number, and reports a most suitable value of the beam number for the mobile phone to the base station; afterwards, the base station performs data communication with the mobile phone by using the most suitable value of the beam number.

5. The millimeter wave mobile phone antenna structure of claim 1, being applied to an FDD (Frequency division duplex) system or a TDD (Time division duplex) system.

6. The millimeter wave mobile phone antenna structure of claim 5, wherein, in an uplink data transmission process of the frequency division duplex system, a best antenna element is selected from the antenna elements to transmit uplink data, and the best antenna element is determined as follows:

$m_0 = \max\{R(i_0, m)\}$, where $R(i_0, m)$ is an RSSI of a broadcast signal received by an m-th antenna element among the antenna elements when a base station transmits the broadcast signal with a beam number $i_0$;

and wherein for the TDD system, the weighting function of each port for uplink transmission is same as that used for downlink receiving.

* * * * *